US012583212B2

(12) United States Patent
Rangwalla

(10) Patent No.: US 12,583,212 B2
(45) Date of Patent: Mar. 24, 2026

(54) FUNCTIONAL AND RECYCLABLE MATERIALS WITH ELECTRON BEAM CROSSLINKING FOR VARIOUS PACKAGING APPLICATIONS

(71) Applicant: Energy Sciences Inc., Wilmington, MA (US)

(72) Inventor: Imtiaz Rangwalla, Wilmington, MA (US)

(73) Assignee: Energy Sciences Inc., Wilmington, MA (US)

( * ) Notice: Subject to any disclaimer, the term of this patent is extended or adjusted under 35 U.S.C. 154(b) by 0 days.

(21) Appl. No.: 17/990,690

(22) Filed: Nov. 20, 2022

(65) Prior Publication Data

US 2024/0165940 A1 May 23, 2024

(51) Int. Cl.
| | |
|---|---|
| *B32B 38/00* | (2006.01) |
| *B32B 7/12* | (2006.01) |
| *B32B 27/08* | (2006.01) |
| *B32B 27/32* | (2006.01) |
| *B32B 37/12* | (2006.01) |
| *B32B 37/18* | (2006.01) |

(52) U.S. Cl.
CPC .............. *B32B 37/182* (2013.01); *B32B 7/12* (2013.01); *B32B 27/08* (2013.01); *B32B 27/32* (2013.01); *B32B 37/12* (2013.01); *B32B 37/1284* (2013.01); *B32B 2038/0028* (2013.01); *B32B 2038/0076* (2013.01); *B32B 2250/02* (2013.01); *B32B 2305/72* (2013.01); *B32B 2310/0887* (2013.01); *B32B 2553/00* (2013.01)

(58) Field of Classification Search
CPC ......... B32B 37/182; B32B 7/12; B32B 27/08; B32B 27/32; B32B 37/12; B32B 37/1284; B32B 2038/0028; B32B 2038/0076; B32B 2250/02; B32B 2305/72; B32B 2310/0887; B32B 2553/00
See application file for complete search history.

(56) References Cited

U.S. PATENT DOCUMENTS

| | | | |
|---|---|---|---|
| 6,528,127 B1 | 3/2003 | Edlein et al. | |
| 6,743,492 B2 | 6/2004 | Bray | |

(Continued)

FOREIGN PATENT DOCUMENTS

| | | |
|---|---|---|
| DE | 202013101109 U1 | 6/2014 |
| WO | 2003027009 A1 | 4/2003 |

(Continued)

OTHER PUBLICATIONS

Rangwalla, Im, Energy Sciences Inc., Electron Beam Crosslinking of Polyolefin Films for Various Packaging Applications, published Oct. 15, 2017 (also see https://uvebtech.com/articles/2016/electron-beam-cross-linking-of-polyolefin-films-for-various-packaging-applications/). (Year: 2017).*

(Continued)

*Primary Examiner* — Cynthia L Schaller
(74) *Attorney, Agent, or Firm* — Hamilton, Brook, Smith & Reynolds, P.C.

(57) ABSTRACT

Disclosed herein is a novel, sustainable and recyclable flexible packaging film used for the purpose of food and non-food packaging. The invention also relates to improved method of manufacturing the recyclable flexible packaging film which results in enhanced recyclability of the film.

9 Claims, 2 Drawing Sheets

(56) References Cited

U.S. PATENT DOCUMENTS

| | | | |
|---|---|---|---|
| 6,772,683 | B2 | 8/2004 | Laksin et al. |
| 7,063,882 | B2 | 6/2006 | Mossbrook et al. |
| 8,729,147 | B2 | 5/2014 | Baptista et al. |
| 2002/0119295 | A1* | 8/2002 | Speer ...................... B41M 5/44 |
| | | | 428/206 |
| 2003/0027009 | A1 | 2/2003 | Bray et al. |
| 2017/0182829 | A1 | 6/2017 | Rangwalla et al. |
| 2018/0215884 | A1 | 8/2018 | Takasugi |
| 2018/0345633 | A1* | 12/2018 | Yuno ...................... B32B 5/145 |
| 2020/0324513 | A1 | 10/2020 | Tian et al. |
| 2021/0339925 | A1 | 11/2021 | Berbert et al. |
| 2022/0001660 | A1 | 1/2022 | Rangwalla et al. |
| 2022/0063252 | A1* | 3/2022 | Sangmule ................. B32B 7/12 |
| 2022/0332100 | A1 | 10/2022 | Ginosatis |

FOREIGN PATENT DOCUMENTS

| | | | |
|---|---|---|---|
| WO | 2012173817 | A2 | 12/2012 |
| WO | 2015061980 | A1 | 5/2015 |
| WO | 2017068881 | A1 | 4/2017 |
| WO | 2019132954 | A1 | 7/2019 |
| WO | 2021011213 | A1 | 1/2021 |
| WO | 2024/108223 | A1 | 5/2024 |

OTHER PUBLICATIONS

Rangwalla, Im, "Re-cylable mono-material packaging options with electron beam technology (Conference Presentation)," Flexpackcon 2023, Montreal, Quebec (Oct. 10-12, 2023).

Rangwalla, Im, "Recyclable Packaging Options with Electron Beam Curing Technology (Conference Presentation)," Radtech Europe, virtual conference (Oct. 19-20, 2021).

Exxonmobil, "Presentation: Flexible food packaging," Dusseldorf, Germany (Oct. 2019).

European Search Report for European Application No. 20840920.1, entitiled "Electron Beam (EB) Curing of Inks and In-Situ Crosslinking of Substrates to Provide Sustainable," mailing date Aug. 18, 2022.

Final Office Action for U.S. Appl. No. 16/973,110, entitled "Electron Beam (EB) Curing of Inks and In-Situ Crosslinking of Substrates to Provide Sustainable and Recyclable Flexible Packaging Solutions," with a mailing date Jan. 8, 2024.

PCT International Search Report and Written Opinion for application No. PCT/US2020/040858 filed Jul. 6, 2020, date of mailing Sep. 22, 2020.

Office Action for U.S. Appl. No. 16/973,110, filed Dec. 8, 2020, with mailing date Feb. 27, 2023.

PCT International Search Report and Written Opinion, PCT/US2023/080584, dated Mar. 19, 2024.

Im Rangwalla, Sustainable and Recylable packaging options for mono materials using EB technology status update, Antec 2025 Philadelphia PA, Mar. 3-6, 2025, 33 pp.

Non-Final Office Action dated Jun. 26, 2024, entitled, "Electron Beam (EB) Curing of Inks and In-Situ Crosslinking of Substrates to Provide Sustainable and Recyclable Flexible Packaging Solutions," U.S. Appl. No. 16/973,110, 15 pp.

* cited by examiner

FUNCTIONAL AND RECYCLABLE MATERIALS WITH ELECTRON BEAM CROSSLINKING FOR VARIOUS PACKAGING APPLICATIONS

FIELD OF INVENTION

The present invention relates generally to sustainable and recyclable flexible packaging, and more particularly to an electron beam (EB) crosslinked polyethylene based flexible packaging for food and non-food applications.

BACKGROUND

Flexible packaging has long been used for food, non-food, and pharmaceutical applications, and may extend beyond these areas for other uses. Plastic films, paper and metalized films are used in various combinations to make laminates that are then used to form different types of packaging depending on the types and conditions of use required. Flexible packaging is economical and utilizes a lower carbon footprint as compared to rigid packaging. This trend is driving consumers and companies to move more aggressively towards the use of flexible packaging that is recyclable.

Rigid packaging includes packaging made from metals, glass and rigid plastics, e.g., bottles and cans, some of which are not recyclable. As a result, the flexible packaging industry is growing faster than other packaging segments. A recent FPA (Flexible Packaging Association) report disclosed that revenues in North America for 2017 were $31.0 billion. The global market for flexible packaging is close to $100 billion, with a growth of 4-5% annually with Asia showing the largest growth rate.

Polymer based multi-layer flexible packaging is popular these days because this approach provides a combined performance of the different polymers used to manufacture these products. The multi-layered polymer flexible packaging products are popular because the combination of several layers of different materials improves the mechanical and physical properties of the packaging film, e.g., improving heat and moisture resistance, oxygen barrier properties, antibacterial and antiviral properties, puncture or tear resistance, etc. Multi-layer flexible packaging products and their method of formation have been described in, e.g., PCT/US2017/068881 (Bemis).

These properties have improved the packaged product quality and shelf life, thereby encouraging the big players in the field to move towards flexible multi-layered packaging. At the same time there is a global urgency to creating more recyclable products and materials. Unfortunately, the existing technologies are frequently not recyclable, or otherwise difficult and expensive to recycle. As a consequence of this poor recyclability, these multi-layered packaging materials create mostly unwanted non-biodegradable waste.

Another global emerging issue is the increased awareness of plastics in our landfills, oceans and rivers, and the resulting demands to reduce our global carbon footprint. Companies like P&G and Unilever are feeling pressure to have sustainable packaging mandates that include reduced packaging, reduced carbon footprints, and recyclable materials. The EB curing of inks and lacquers for packaging have been discussed in U.S. Pat. Nos. 6,528,127, 7,063,882, 6,772,683, and 8,729,147, for example, and provide teachings of inks having low to zero volatile organic compounds (VOCs), which can help to reduce the carbon footprint by almost 3×. The above patents and application (U.S. Pat. Nos.

6,528,127, 7,063,882, 6,772,683, and 8,729,147, and PCT/US2017/068881 (Bemis)) are incorporated by reference.

The materials used in most of the currently available flexible packaging structures are not considered readily recyclable because of the presence of two or more dissimilar films or layer materials used to manufacture the final package. For packaging to be considered recyclable, the top film and the subsequent layers/films, including for example a laminated film (e.g., sealant film), must be of the same or similar material and be e-beam cross-linkable. By way of example only, polyethylene packaging containing the same or similar materials can be pelletized and recycled. Provided that the above-noted material requirements are followed, many other frequently used materials in flexible packaging can be made recyclable.

On the other hand, the existing traditional films uses solvent ink, which is considered as unsafe, environmentally harmful, and costly in nature.

Hence, there is a need to develop a novel, sustainable, and functional packaging flexible film made up of similar films to achieve the property of enhanced recyclability without using solvent inks that are harmful to the environment.

The Applicant has sought to address some of the above problems as discussed in detail below.

SUMMARY OF THE INVENTION

The primary objective of the invention is to provide a novel, functional flexible package, and method of manufacturing thereof.

According to an embodiment of the present invention, there is provided a flexible package product that is fully functional for the purpose of packaging food and non-food items, results in substantial efficiencies in production and material costs, and is completely and easily recyclable.

According to an embodiment of the present invention, there is provided a method of manufacturing of a recyclable flexible packaging.

According to another embodiment of the present invention, there is provided a recyclable flexible packaging that comprises, a substrate layer comprising polyethylene (PE) film, and a sealant layer comprising a sealant polyethylene film disposed over the substrate layer using an adhesive.

According to the present invention, at least a portion of the substrate layer is crosslinked using electron beam radiation and the substrate layer is further stretched or oriented in at least one direction.

According to another embodiment of the present invention, the thickness of the polyethylene film is in the range between 15-40-microns.

According to another embodiment of the present invention, the polyethylene film is at least one polyethylene selected from the group consisting of high-density polyethylene, medium density polyethylene, low density polyethylene, linear low-density polyethylene, or combinations thereof.

According to another embodiment of the present invention, the EB crosslinked polyethylene film is stretched at least in one direction selected from the group consisting of machine direction orientation, transverse direction orientation, or biaxial orientation.

According to yet another embodiment of the present invention the Polyethylene film is a blown film.

According to another embodiment of the present invention the Polyethylene film is made of several layers, the layers consisting of HDPE\MDPE\MDPE\LLDPE\LDPE or combinations involving all or some of the above layers.

According to another embodiment of the present invention the polyethylene film contains copolymers of polyethylene and ethylene vinyl acetate.

According to another embodiment of the present invention, the thickness of the adhesive is in the range between 1-4 microns.

According to another embodiment of the present invention, the adhesive comprises at least one thermoplastic polymer selected from the groups consisting of copolymers of olefins and (meth-) acrylic acid or derivatives thereof, copolymers of olefins and vinylic compounds, polyolefins, preferably polyethylene, copolymer of ethylene and α-olefins, polyesters, polyamides, thermoplastic synthetic rubber, metallocene-catalyzed polymers, isocyanate polyurethane adhesives, ionomers, or combination thereof.

According to another embodiment of the present invention, the thickness of the sealant polyethylene film is in the range between 50-100 microns.

According to another embodiment of the present invention, the sealant polyethylene film is at least one thermoplastic polymer selected from the group consisting of high-density polyethylene, medium density polyethylene, low density polyethylene, linear low-density polyethylene, or combination thereof.

According to yet another embodiment of the present invention the sealant film is multi- or single layered.

According to another embodiment of the present invention the sealant film includes a barrier layer, for example EVOH coextruded in the layer(s) of the film. In another embodiment of the present invention, the sealant layer does not include a barrier layer.

According to yet another embodiment the sealant film is biaxially oriented PE film.

According to another embodiment of the present invention, there is provided a method for manufacturing a recyclable flexible packaging film, the method comprises the steps of, crosslinking at least a portion of a polyethylene film using electron beam (EB) radiation to obtain an EB crosslinked polyethylene film, stretching the EB crosslinked polyethylene film to obtain an oriented film, and laminating the oriented film to a sealant polyethylene film using an adhesive.

According to another embodiment of the present invention, the cross linking of the polyethylene film is performed by offline treating with electron beam at 90-125 kV and 60-90 kGy.

According to another embodiment of the present invention, there is provided an environmentally safe packaging which is free from solvent inks. The absence of solvent inks in the packages thus reduces the manufacturing cost of the packages according to the present invention.

According to another embodiment of the present invention, there is provided a monolayered or multilayered film package having a single type of polymer, which is polyethylene, in various layers for enhancing functionality and recyclability Thus, the advantages of the present invention are, but not limited to, lesser waste, faster and enhanced recyclability, and film stability.

DETAILED DESCRIPTION OF THE INVENTION

Figure 1:
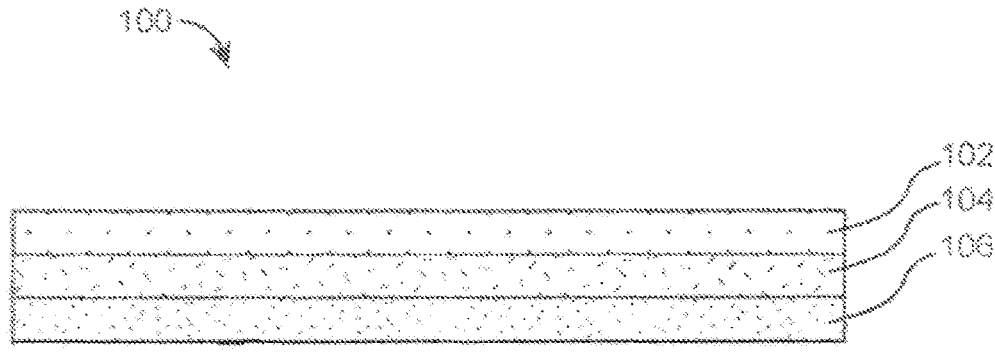
FIG. 1 illustrates a cross sectional view of a recyclable 100 flexible package according to an exemplary embodiment of the present invention.

Aspects of the present invention are best understood by reference to the description set forth herein. All the aspects described herein will be better appreciated and understood when considered in conjunction with the following descriptions. It should be understood, however, that the following descriptions, while indicating preferred aspects and numerous specific details thereof, are given by way of illustration only and should not be treated as limitations. Changes and modifications may be made within the scope herein without departing from the spirit and scope thereof, and the present invention herein includes all such modifications.

Several aspects of the present invention are disclosed herein. It is to be understood that these aspects may or may not overlap with one another. Thus, part of one aspect may fall within the scope of another aspect, and vice versa. Each aspect is illustrated by a number of embodiments, each of which in turn, can include one or more specific embodiments. It is to be understood that the embodiments may or may not overlap with each other. Thus, part of one embodiment, or specific embodiments thereof, may or may not fall within the ambit of another, or specific embodiments thereof, and vice versa.

A broad framework of the principles will be presented by describing various embodiments of this invention using exemplary aspects. The terms "one embodiment" or "an embodiment" means that a particular feature, structure, material, or characteristic described in connection with the embodiment is included in at least one embodiment of the disclosure. For clarity and ease of description, each aspect includes only a few embodiments. Different embodiments from different aspects may be combined or practiced separately, to design a customized process or product depending upon application requirements. Many different combinations and sub-combinations of a few representative processes or structures shown within the broad framework of this invention, that may be apparent to those skilled in the art but not explicitly shown or described, should not be construed as precluded.

The present invention relates to a novel, simple sustainable, functional, and flexible packaging film, and method of manufacturing thereof. The film of the present invention having enhanced recyclability.

Definitions

Reference to "layer(s)" or "film(s)" as used herein refers to a structure of a single polymer type or a blend of polymers.

Reference to "substrate" as used herein refers to a base material on which processing is conducted to produce new films or layers of material such as deposited coatings. In the present invention a "substrate" is selected from polyethylene polymer materials.

Reference to "EB" as used herein refers to a process that involves using electrons, usually of high energy, to treat an object for the purpose of cross-linking and/or curing.

Reference to "polyethylene" as used herein refers to a polymer of ethylene (or ethene) monomer having a structural formula $-(CH_2-CH_2-)_n$. Polyethylene is described as a lightweight, durable thermoplastic with a variable crystalline structure. It is a linear, homo-polymer, which has a partially amorphous phase and partially crystalline phase. The amorphous phase imparts flexibility and high impact strength while the crystalline phase imparts a high softening temperature and rigidity. Therefore, it is primarily used for packaging (plastic bags, plastic films, geomembranes, containers including bottles, etc.).

Reference to "crosslinking" or "cross-linked" as used herein refers to any covalent bonds or ionic bonds that links one polymeric chain to another. Crosslinking usually refers to promoting a change in the physical properties of the polymer.

Reference to "adhesive," as used herein refers to a material placed on one or more layers, partially or entirely, to promote the adhesion of one layer to another surface. A laminating layer may comprise an adhesive composition. Preferably, such layers or coatings of an adhesive composition that are positioned between two layers of a multilayer flexible package are used to maintain the two layers in position relative to each other. Optionally, an adhesive or an adhesive layer may comprise components that can be cured by UV/EB radiations to improve the functionality and utility of the laminating layer to provide a desired level of adhesion with one or more surfaces in contact with the laminating layer material.

Reference to a "sealant polyethylene film" as used herein refers to one that binds to itself or another film or layer to form a hermetic seal. That is, the sealant polyethylene film comprises a polyethylene polymer or polymer mixture that softens when exposed to heat and returns to its original condition when cooled to room temperature. Instead of polyethylene, the sealant layer may comprise any suitable thermoplastic material including, but not limited to, synthetic polymers such as polyesters, polyamides, polyolefins, polystyrenes, and the like. Thermoplastic materials may also include any synthetic polymers that are cross-linked by either radiation or chemical reaction during a manufacturing or post-manufacturing process operation.

Reference to a "machine direction orientation" (otherwise known as MDO) as used herein refers to a machine/longitudinal direction in which single layered or multilayered films are stretched and oriented at a lower temperature than that of the thermoplastic resin or polymer.

Reference to a "functional" as used herein describes the films that are applied over the substrate to enhance the qualities and characteristics of the films. The films according to the present invention are used to make the packages functional from all aspects. These films are used for packaging food and non-food items at the stores, or at residents and are sustainable.

As noted above, the current market for flexible packaging for food and non-food items, e.g., detergent, shampoo pouches, etc., uses different polymers as the substrates in the packaging. These materials are predominantly polyester (PET) and oriented polypropylene (OPP). Each of these materials are used to provide heat resistance during sealing operations, with sealing temperatures as high as approximately 150-200 C. While polyethylene is widely used in most packaging articles, untreated polyethylene (i.e., not EB treated beforehand) used in place of PET or OPP would melt during the heat-sealing step and stick to the sealing jaws, thus making the process ineffective and unworkable. Any resulting pouch or packaging would not pass any quality assurance assessments, and potentially could not even be made.

Applicant discovered that using EB radiation would address these problems noted above by providing increase in temperature resistance. However, EB crosslinking decreases the melt flow index (MFI) and thus creates some gel spots. Hence it is desirable to have a minimum thickness of the EB crosslinked layer in the overall film.

Referring to FIG. 1, according to another embodiment of the present invention, there is provided a recyclable flexible packaging (100) that comprises, a substrate layer (102) comprising polyethylene (PE) film, and a sealant layer (106) comprising a sealant polyethylene film. The sealant polyethylene film is disposed over the substrate layer (102) using an adhesive (104) in between the sealant layer and the substrate layer. According to the present invention, at least a portion of the substrate layer (102) is crosslinked using electron beam radiation and is further stretched or oriented in the machine direction.

The substrate layer (102) comprises a polyethylene film. In one embodiment, the substrate layer (102) is a monolayered film. In another embodiment, the substrate layer (102) is a multi-layered film which includes a polyethylene-based polymer or a combination of one or more types of the polyethylene-based polymers. Polyethylene based polymers are frequently categorized based upon their densities, for example high density polyethylene (HDPE), Medium-density polyethylene (MDPE), low density polyethylene" (LDPE) and Linear Low Density Polyethylene (LLDPE). The OPE films described herein may consist of polyethylene homopolymers of one or more densities.

High density polyethylene (HDPE) is ordinarily used in the art to refer to both a.) homopolymers and b.) copolymers of ethylene and an α-olefin (usually 1-butene or 1-hexene) with densities between about 0.960 to 0.970 g/cm³ for homopolymer and between 0.940 and 0.958 g/cm³ for copolymers. HDPE includes polymers made with Ziegler or Phillips type catalysts and is also said to include high molecular weight "polyethylenes."

Medium-density polyethylene (MDPE) typically has a density from 0.928 to 0.940 g/cm³. MDPE can be produced by chromium/silica catalysts, Ziegler-Natta catalysts or metallocene catalysts.

Low density polyethylene (LDPE) is another type of a high pressure low density polyethylene polymer. It is defined by a density range between 0.915 and 0.940 g/cm³.

Linear Low Density Polyethylene (LLDPE) is structurally similar to LDPE, but it has a linear backbone having a density range from 0.915 to 0.940 g/cm³. It is made by copolymerizing ethylene with 1-butene and smaller amounts of 1-hexene and 1-octene, using Ziegler-Natta or metallocene catalysts.

In one exemplary embodiment of the invention, the polyethylene film is a monolayer of a HDPE. In another exemplary embodiment, the polyethylene film is multilayer laminate, preferably a combination of at least a HDPE and a MDPE. In another embodiment, the polyethylene film is multilayered laminate having the following design: HDPE/MDPE/HDPE. In another embodiment, the multilayered laminate of polyethylene film has the following design: HDPE-mLLDPE/MDPE/HDPE-LLDPE.

In one embodiment of the present invention, the polyethylene film is a machine direction oriented (MDO) film. In another embodiment, the polyethylene film is a transverse direction-oriented film (TDO). In another embodiment, the polyethylene film is a biaxially oriented film (BOPE). In another embodiment, the polyethylene film is a cast polyethylene film. In another embodiment, the polyethylene film is blown polyethylene film.

In one embodiment, the thickness of the substrate layer (102) ranges between 15-40 microns.

According to the present invention, the adhesive (104) comprises at least one thermoplastic polymer selected from the group consisting of copolymers of olefins and (meth-) acrylic acid or derivatives thereof, copolymers of olefins and vinylic compounds, polyolefins, preferably polyethylene, copolymer of ethylene and α-olefins, polyesters, polyamides, thermoplastic synthetic rubber, metallocene-catalyzed polymers, polyurethane, ionomers and combination of two or more of these thermoplastic polymers.

In one embodiment the adhesive comprises a solvent free adhesive, preferably a polyurethane adhesive system having a density of 9.5 lbs/gallon, a viscosity in the range of 2,500-3,500 cPs, and curing times of 3 days at 77° F. In one exemplary embodiment, the polyurethane adhesives are liquid. In another exemplary embodiment, the polyurethane adhesives are hot melt adhesives.

EB curing of adhesive offers several advantages to the packaging market such as instantaneous bond creation and ultra-fast cure speeds and offers converter a quick turn-around time for the laminated products. Additional benefits include stable formulations, reduced or zero volatiles, easy to clean systems and suitable curing systems, all of which make EB cured laminates more appropriate for commercial use.

In another embodiment of the present invention, the thickness of the adhesive ranges between 1-4 microns.

In one embodiment, the sealant layer (106) is laminated to the substrate layer (102) using an adhesive. In another embodiment, the sealant layer (106) is extruded or coextruded with the substrate layer (102). In another embodiment, the sealant layer (106) is laminated to the substrate layer (102) by means of heat treatment.

The sealant polyethylene film of the recyclable flexible package contains a layer of polyethylene polymer to form a multilayered flexible package that is recyclable. The sealant polyethylene film layer thickness is in the range between 50-100 microns.

According to the present invention, the sealant layer (106) comprises a polyethylene film, which is selected from the group consisting of high-density polyethylene, medium density polyethylene, low density polyethylene, linear low density polyethylene, or combinations thereof.

In one embodiment, the sealant layer (106) is a coextruded polyethylene layer. The present invention is not limited to a coextruded layer but also includes oriented polyethylene, biaxially oriented polyethylene, any suitable thermoplastic ethylene based material, and other polymers that are known in the prior art. In one exemplary embodiment, the sealant polyethylene film is a uniaxially oriented film. In another exemplary embodiment, the sealant polyethylene film is a biaxially oriented film. In another exemplary embodiment, the sealant polyethylene film is non oriented film.

According to an embodiment of the present invention, a method for manufacturing a recyclable flexible packaging film comprising the steps of, crosslinking at least a portion of a polyethylene film using electron beam (EB) radiation to obtain an EB crosslinked polyethylene film, stretching the EB crosslinked polyethylene film to obtain an oriented film, and laminating the oriented film to a sealant polyethylene film using an adhesive.

According to the present invention, the electron beam crosslinking is performed by applying offline electron beam radiation treatment to the polyethylene film at a range of 70-125 kV and 60-120 kGy. Generally, EB crosslinking provides an increase in temperature resistance, decreases the melt flow index (MFI) and thus creates some gel spots.

Hence it is desirable to have a minimum thickness of the EB crosslinked layer in the overall film to avoid the formation of gel spots and to improve the recyclability of the film.

After treating the polyethylene film with EB radiation, an EB crosslinked polyethylene film is obtained, which is further stretched in one or more orientations, but not limited to, machine direction orientation, transverse direction orientation, or biaxial orientation. Stretching the EB crosslinked polyethylene film further reduces the thickness of the film as well as the thickness of crosslinked portion of the film. In one exemplary embodiment, the EB crosslinked polyethylene film is stretched in machine direction orientation to obtain a MDO film. In one embodiment, EB treatment inline with the blown film and stretching unit is used to obtain an EB crosslinked MDO film.

The EB crosslinked polyethylene film is further laminated to a sealant polyethylene film. The lamination is done by using an adhesive between the EB crosslinked polyethylene film and the sealant polyethylene film.

According to the present invention, the thickness of the polyethylene film upon crosslinking and stretching ranges between 15-40 microns. The thickness of the adhesive ranges between 1-4 microns. The thickness of the sealant polyethylene film layer is in the range between 50-100 microns.

The method of manufacturing of recyclable flexible packaging film of the present invention is applied to the manufacturing of a barrier shrink bag (BSB) film wherein the BSB film is manufactured using double bubble technique. The EB treatment is performed between the first and the second bubble of the BSB film followed by stretching the EB treated bubbles in the desired orientation. The resulting BSB film has enhanced recyclability and the method overcomes the gel spots problem.

According to the present invention, the thickness of the recyclable flexible packaging film ranges between 50-100 microns.

The recyclable flexible packaging film of the present invention can be used to make a package for food and non-food items.

According to one exemplary embodiment, the package is a stand-up pouch. However, the present invention is not limited to stand up pouches but also covers other applications like manufacturing of barrier shrink bags, lidding films, vacuum skin packaging, and other films that are known in the prior art.

The film, method and formulation of the present invention is explained in more detail with the help of following examples. Examples/Trials are provided for illustrative purposes only and are not intended to limit the scope of the invention.

Example 1

Figure 2:
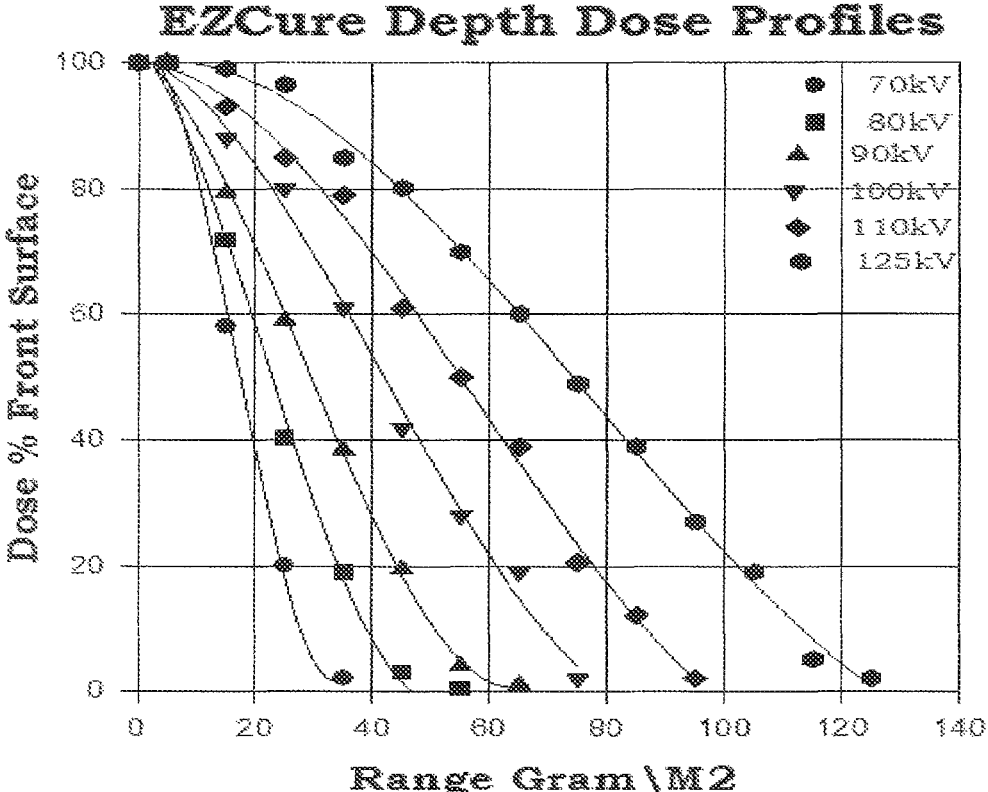
FIG. 2 illustrates a depth dose profile of a 3-5 layered polyethylene (PE) film according to one embodiment of the present invention.

According to one exemplary embodiment, a polyethylene film having 3 to 5 layered structure is blown on a Varex or similar blown film equipment. At this stage the thickness of the film is about 135 microns. Treating a portion of the PE film with electron beam at 125 kV and 90 kGy with the depth dose profiles illustrated in FIG. 2. According to FIG. 2, about 40 grams/m$^2$ (about 40 microns) of the film gets 90 kGy of dosing. After crosslinking, the film is stretched from 135 to 25 microns. So, in this case the thickness of the crosslinked portion is also reduced by 5.4 times. Hence, the thickness of the EB crosslinked portion of the polyethylene film is 40/5.4=7.4 microns. The polyethylene film, which was EB treated before MDO, is then laminated to a 75 microns thick sealant film. But in this case the EB crosslinked layer is only 7 microns compared to 25 microns. Thus, resulting in improved recyclability compared to the traditional films claimed in the prior art.

Example 2

According to another exemplary embodiment, a Barrier Shrink Bag (BSB) bag is made using 5-7 layers which comprises Ethylene vinyl alcohol as a barrier. These films are manufactured using double or triple bubble process. The process starts with offline EB treatment on typically a 40-50 microns thickness walled BSB film to provide temperature resistance to the outer layers, at 90-125 kV 60-80 kGy on both sides of the film. Almost the entire thickness of the film is EB treated making it difficult for recycling since the EB crosslinking reduces MFI and makes it difficult to recycle.

In parallel, EB treatment between the first and the second bubble, and again both sides of the bubble was carried out. In this case, the initial wall thickness of BSB film is about 400-500 microns. Then after stretching and orienting it in the subsequent bubbles the thickness is reduced to 40-50 microns. The crosslinked portion of the BSB film drops to 4-5 microns. Dropping the thickness of the EB crosslinked layer to less than 10% makes the BSB film much easier to recycle. Thus, the final product was as functional as EB treated after the full offline process. But in addition to that, EB treatment between the first and the second bubble provided other processing advantages like, bubble stability, less waste, and faster process.

Example 3

According to another exemplary embodiment, a 7 to 13 layered film is used to make a heat resistant lidding film. In accordance with the present invention, the EB treatment crosslinking is carried out in between the two-polyethylene structures of the film (i.e., between the 2-bubbles) followed by stretching in a desired orientation to allow enhanced recyclability and functionality of the film. This treatment provides better properties as compared to the traditional multi-layered film having PET or OPP as one of the outer layers, which provides enhanced heat resistance and recyclability as the film of the present invention comprises a single type of polymer unlike the traditional PET/PE film.

Comparative Example

First case: EB treatment is carried out on a MDO film having thickness of 25 grams/m². The resultant film is an EB crosslinked film having thickness of 25 grams/m². The film is further laminated to an 80 grams/m² sealant film.

Second case: EB treatment is carried out on 30 grams/m² thickness of a 135 grams/m² thickness film followed by MDO stretching of the film. The resultant film is a EB crosslinked film having a thickness of 25 grams/m², where the EB crosslinked portion is about 5 grams/m². Finally, the EB crosslinked and stretched film is laminated to an 80 grams/m² sealant film, where the EB crosslinked portion is less than 5% of the total thickness of the film.

Comparing both cases, the film from the second case showed an easier recyclability than that of the film from first case. This is due to the difference in thickness of the crosslinked portion of the film. The film from the first case, where EB treatment is done after MDO, had a thickness of 25 grams/m² of EB crosslinked layer, which makes the film more difficult to recycle as compared to the film from second case, where EB treatment is done before the MDO and the thickness of EB crosslinked layer is 5 grams/m².

Results and Discussion:

The film according to the present invention has easier recyclability than the traditional films because of the similar ingredients.

Thus, the advantages of the present invention, include but are not limited to, lesser waste, enhanced recyclability, and film stability. The package in accordance with the present invention is environmentally safe with less manufacturing cost compared with the traditional packages that uses solvent inks. The reason is the package of the present invention does not contain harmful and costlier solvent inks. Further, the film and package of the present invention is used in both food, and non-food applications.

The flexible packaging products are completely recyclable in nature and compliant with existing recycling laws. The processes used to create the finished flexible packaging products having the disclosed structures are more economical and efficient The entire teachings of U.S. application Ser. No. 16/973, 110 and US 2022/0001660 A1 are incorporated herein by reference. The entire teachings of International Application No. PCT/US2020/040858 and WO 2021/011213 are incorporated herein by reference.

The foregoing exemplary embodiments are provided for illustrative purposes only and are not intended to limit the scope of the invention.

REFERENCE NUMERALS

100—Recyclable flexible package
102—Substrate Layer
104—Adhesive
106—Sealant Layer

The invention claimed is:

1. A method for manufacturing a recyclable flexible packaging film, comprising:
  crosslinking a portion of a polyethylene film using electron beam (EB) radiation to obtain an EB crosslinked polyethylene film;
  stretching the EB crosslinked polyethylene film to obtain an oriented film, a stretched thickness of the portion being less than 10% of a thickness of the oriented film; and
  laminating the oriented film to a sealant polyethylene film using an adhesive,
  wherein the electron beam radiation is applied at 70-85 kV.

2. The method of claim 1, wherein the polyethylene film comprises at least one selected from the group consisting of high-density polyethylene, medium density polyethylene, low density polyethylene, linear low-density polyethylene, or combinations thereof.

3. The method of claim 1, wherein the EB crosslinked polyethylene film is stretched in at least one direction selected from the group consisting of: machine direction orientation, transverse direction orientation, or biaxial orientation.

4. The method of claim 1, wherein the adhesive comprises at least one thermoplastic polymer selected from the group consisting of copolymers of olefins and (meth-) acrylic acid or derivatives thereof, copolymers of olefins and vinylic compounds, polyolefins, polyethylene, copolymer of ethylene and α-olefins, polyesters, polyamides, thermoplastic synthetic rubber, metallocene-catalyzed polymers, isocyanate polyurethane adhesives, ionomers, or combination thereof.

5. The method of claim 1, wherein the sealant polyethylene film comprises at least one thermoplastic polymer selected from the group consisting of high-density polyethylene, medium density polyethylene, low density polyethylene, linear low-density polyethylene, or combination thereof.

6. The method of claim 1, wherein the sealant polyethylene film optionally comprises Ethylene vinyl alcohol (EVOH) as a barrier layer.

7. The method of claim 1, wherein the electron beam radiation is applied at 70-80 kV and 60-90 kGy.

8. The method of claim 1, further comprising a stretched thickness of the portion being less than 5% of a thickness of the recyclable flexible packaging film.

9. The method of claim 1, wherein the crosslinking a portion of a polyethylene film using electron beam (EB) radiation is performed before stretching the EB crosslinked polyethylene film to obtain an oriented film.

* * * * *